United States Patent
Furukawa

(10) Patent No.: US 7,453,232 B2
(45) Date of Patent: Nov. 18, 2008

(54) LEAKAGE DETECTOR FOR A POWER SUPPLY APPARATUS FOR A VEHICLE

(75) Inventor: Kimihiko Furukawa, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 496 days.

(21) Appl. No.: 11/172,824

(22) Filed: Jul. 5, 2005

(65) Prior Publication Data

US 2006/0006840 A1 Jan. 12, 2006

(30) Foreign Application Priority Data

Jul. 6, 2004 (JP) ............................. 2004-199861

(51) Int. Cl.
*H01M 10/46* (2006.01)
(52) U.S. Cl. ...................................... 320/104
(58) Field of Classification Search ................. 320/104, 320/112, 116, 132; 324/426, 430, 433
See application file for complete search history.

(56) References Cited

U.S. PATENT DOCUMENTS

2001/0035765 A1* 11/2001 Maki ........................ 324/765

FOREIGN PATENT DOCUMENTS

JP 2003-169401 6/2003

* cited by examiner

*Primary Examiner*—Edward Tso
(74) *Attorney, Agent, or Firm*—Wenderoth, Lind & Ponack, L.L.P

(57) ABSTRACT

A leakage detector for a power supply apparatus for a vehicle having a voltage detection circuit that detects voltages of a plurality of battery modules. The voltage detection circuit comprises a multiplexer that switches the battery modules voltages of which are detected in a time sharing manner, and a voltage detection portion that detects the voltages of the battery modules switched by the multiplexer. In the power supply apparatus, a particular point of the battery module is connected to a chassis through a leakage detection resistance, and the voltage detection circuit detects a chassis voltage that is induced between the ends of the leakage detection resistance by switching the multiplexer of the voltage detection circuit to detect a leakage resistance based on the chassis voltage.

16 Claims, 8 Drawing Sheets

LEAKAGE DETECTOR FOR A POWER SUPPLY APPARATUS FOR A VEHICLE

BACKGROUND OF THE INVENTION

The present invention relates to a power supply apparatus that drives a motor for running an electric vehicle, such as a hybrid car or an electric car, and particularly to a power supply apparatus for a vehicle capable of accurately detecting a leakage that occurs on the output side of a driving battery with simple circuit configuration.

High voltage is required to increase the output of a power supply apparatus for driving an electric vehicle. The reason is that the output is proportional to the product of a voltage and a current, and that a higher voltage provides an advantage when a motor is driven. For example, the output voltage of a power supply apparatus for driving a hybrid car or an electric car is a very high voltage of 200 V or more. Since workers may receive an electric shock if they touch a high voltage power supply apparatus during maintenance, the high voltage power supply apparatus is not connected to a chassis for reasons of safety. For this reason, this type of power supply apparatus has the ability to measure a leakage resistance in order to disconnect a circuit when an electric shock is detected. The leakage resistance is a resistance between the power supply apparatus and the chassis. FIG. 1 shows a circuit for measuring the leakage resistance in a power supply apparatus. A leakage detection circuit 50 shown in this Figure has a leakage detection resistance 51, a leakage detection switch 52, and a voltage detection circuit 53 that detects the voltage produced across the leakage detection resistance 51. When a leakage resistance Rr exists, in the state where the leakage detection switch 52 is ON, a current flows through the leakage detection resistance 51. Accordingly, a voltage across the leakage detection resistance 51 is measured, and, leakage can be detected.

As shown in this Figure, a power supply apparatus that detects a voltage in a particular portion to detect a leakage resistance has been developed (see Japanese Laid-Open Patent Publication KOKAI No. 2003-169401).

SUMMARY OF INVENTION

In order to detect a leakage resistance between the output side of a driving battery and a chassis, a power supply apparatus that detects a voltage at a particular point is required to have a voltage detection circuit dedicated to measure the voltage. For this reason, this type of device has a disadvantage that the circuit configuration is complex to detect a leakage resistance.

The present invention has been developed for solving the disadvantage. It is an important object of the present invention to provide a power supply apparatus for a vehicle that uses a voltage detection circuit previously provided in the power supply apparatus, thus can accurately detect a leakage resistance between the output side of a driving battery and a chassis, and does not require a complex circuit configuration nor a dedicated voltage detection circuit.

A power supply apparatus for a vehicle according to a first aspect of the present invention comprises a driving battery including a plurality of battery modules that are connected to each other in series, and a voltage detection circuit that measures a battery voltage of the driving battery. The voltage detection circuit comprises a multiplexer that switches the battery modules the voltages of which are to be measured in a time sharing manner, and a voltage detection portion that measures the voltages of the battery modules switched by the multiplexer. In the power supply apparatus, a particular point of the battery module is connected to a chassis through a leakage detection resistance, and the voltage detection circuit measures a chassis voltage that is induced between the ends of the leakage detection resistance by switching the multiplexer of the voltage detection circuit to measure a leakage resistance based on the chassis voltage.

In a power supply apparatus for a vehicle according to a second aspect of the present invention, the voltage detection circuit comprises a detection switch that connects the particular point of the battery module to the chassis through the leakage detection resistance when measuring the leakage resistance. The voltage detection circuit connects the particular point of the battery module to the chassis by turning the detection switch ON and thus measures the chassis voltage that is induced across the leakage detection resistance to measure the leakage resistance.

In a power supply apparatus for a vehicle according to a third aspect of the present invention, the multiplexer of the voltage detection circuit switches an input side of the voltage detection portion between positive and negative sides of the driving battery, and the voltage detection circuit detects positive and negative side output voltages of the driving battery and calculates the leakage resistance based on the detected positive and negative side output voltages and the chassis voltage.

A power supply apparatus for a vehicle according to a fourth aspect of the present invention comprises a plurality of sets of voltage detection circuits, and the voltage detection circuits detect voltages of battery modules separated into a plurality of blocks, respectively, and detect the chassis voltages in the state where the particular points are connected to the chassis through the leakage detection resistances to detect the leakage resistances.

A power supply apparatus for a vehicle according to a fifth aspect of the present invention comprises a plurality of sets of voltage detection circuits, the voltage detection circuits detect voltages of battery modules separated into a plurality of blocks, respectively, and one of the voltage detection circuits detects the chassis voltage in the state where a particular point is connected to the chassis through the leakage detection resistance to detect the leakage resistance.

In a power supply apparatus for a vehicle according to a sixth aspect of the present invention, the voltage detection circuit detects positive and negative side output voltages of the driving battery and the chassis voltage by switching the multiplexer to detect the leakage resistance.

In a power supply apparatus for a vehicle according to a seventh aspect of the present invention, a leakage test resistance is connected between the driving battery and the chassis through a switching element, and the voltage detection circuit detects the leakage resistance in the state where the switching element is turned ON to connect the driving battery to the chassis through the leakage test resistance.

In a power supply apparatus for a vehicle according to an eighth aspect of the present invention, the voltage detection circuit detects a voltage of a particular point of a battery module, and detects respective voltages of the battery modules.

The aforementioned power supply apparatus for a vehicle has an advantage that it can accurately detect a leakage resistance between the output side of a driving battery and a chassis without a complex circuit configuration. The reason is that in the power supply apparatus for a vehicle according to the present invention, a particular point of a battery module of the driving battery is connected to the chassis through the leakage detection resistance, and the voltage detection circuit detects a chassis voltage that is induced between the ends of the leakage detection resistance by switching the multiplexer of the voltage detection circuit that detects a battery voltage of the driving battery to detect a leakage resistance based on the chassis voltage. That is, the power supply apparatus for a vehicle according to the present invention uses a voltage detection circuit previously provided in the power supply apparatus to detect a battery voltage of the driving battery, and detects a leakage resistance between the output side of the driving battery and the chassis without a dedicated voltage detection circuit that detects the leakage resistance. Therefore, since its circuit configuration is simple, it is possible to reduce producing cost, and additionally the power supply apparatus for a vehicle according to the present invention reliably detects a leakage of a driving battery.

The above and further objects and features of the invention will more fully be apparent from the following detailed description with accompanying drawings.

DETAILED DESCRIPTION OF THE PREFERRED EMBODIMENTS

Figure 1:
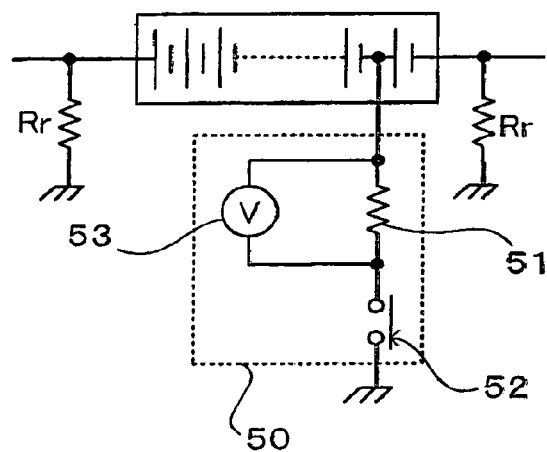
FIG. 1 is a circuit diagram showing a leakage detection circuit in a conventional power supply apparatus.
Figure 2:
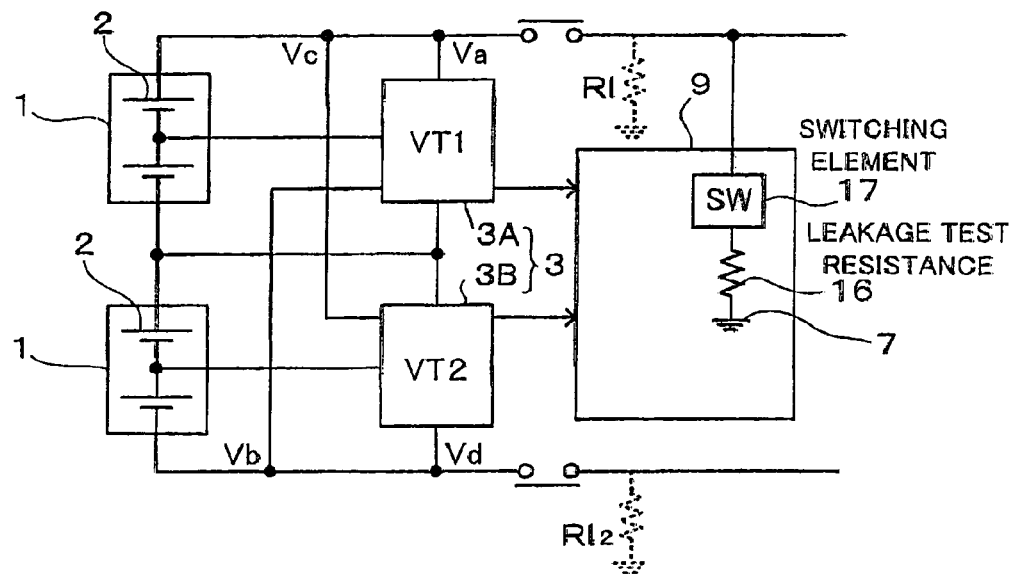
FIG. 2 is a schematic view showing a power supply apparatus according to one embodiment of the present invention.
Figure 3:
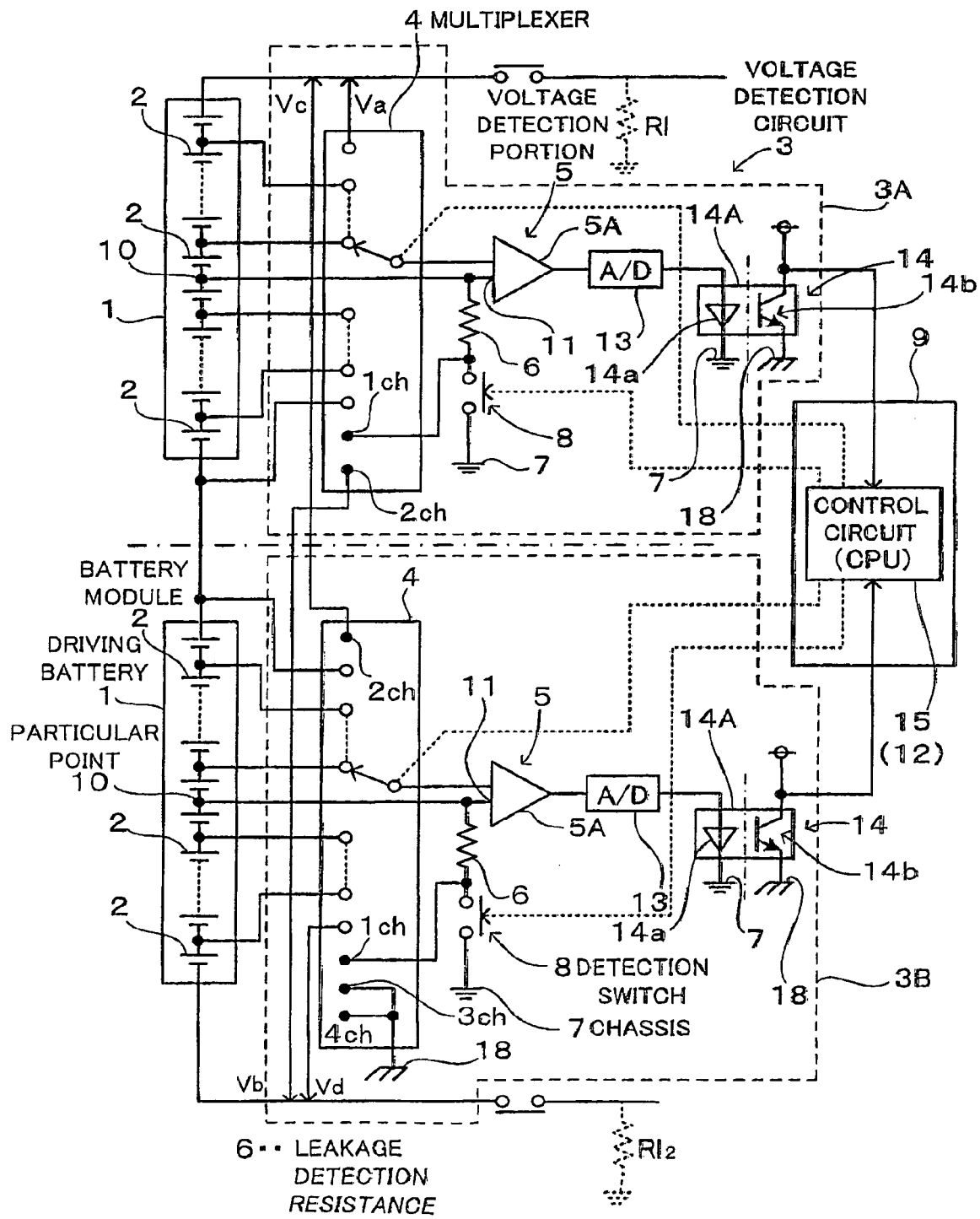
FIG. 3 is a circuit diagram of the power supply apparatus for a vehicle shown in FIG. 2.

A power supply apparatus as shown in FIGS. 2 and 3 comprises a driving battery 1 including a plurality of battery modules 2 that are connected to each other in series, and a voltage detection circuit 3 that detects a battery voltage of the driving battery 1.

The voltage detection circuit 3 comprises a multiplexer 4 that switches the plurality of battery modules 2 in a time sharing manner, a voltage detection portion 5 that detects the voltages of the battery modules 2 selected by the multiplexer 4, and a detection switch 8 that connects a particular point 10 of battery module 2, i.e., a reference input terminal 11 of the voltage detection portion 5 connected to the particular point 10, to a chassis 7 through a leakage detection resistance 6 only in detection of a leakage resistance.

The voltage detection circuit 3 is a circuit that is equipped with the power supply apparatus to detect the voltages of all the battery modules 2. For example, in the case where the power supply apparatus has a driving battery 1 that includes fifty battery modules 2 connected to each other in series, the voltage detection circuit 3 detects the voltages of all fifty battery modules 2. The respective detected voltages of the battery modules 2 can be used for detection of remaining amounts of the battery modules 2, for correction of a remaining amount that is calculated by integrating a charging/discharging current, for interruption of a discharging current in the over-charging state when it is detected that a remaining amount becomes zero, i.e., the battery module 2 is completely discharged, or for interruption of a charging current in the over-charging state when it is detected that the battery module 2 is fully charged.

The driving battery 1 that includes a number of battery modules 2 connected to each other in series is charged/discharged with a common current. Accordingly, the amounts of charging current and discharging current of all the battery modules are the same. However, the electric characteristics of all the battery modules 2 do not always vary equally. Particularly, in the case where the number of charging/discharging operations increases, the battery modules 2 deteriorate to different extents; thus, their capacities when fully charged vary to different extents. In this state, the battery module 2 with a reduced capacity when fully charged tends to be over-charged, and to be over-discharged. Since over-charging and over-discharging deteriorate the electric characteristics of the battery module 2, the battery module 2 with a reduced capacity when fully charged will sharply deteriorate when over-charged or over-discharged. In the driving battery 1 that includes a number of the battery modules 2 connected to each other in series, for this reason, it is important to charge/discharge the battery modules 2 while preventing all the battery modules 2 from being over-charged and over-discharged, i.e., while protecting the battery modules 2. In order to protect all the battery modules 2, the voltage detection circuit 3 detects the respective voltages of the battery modules 2.

In the power supply apparatus shown in FIGS. 2 and 3, the battery modules 2 are separated into two blocks. In order to detect the voltages of the battery modules 2 that are separated into the two blocks, two sets of the voltage detection circuits 3 are provided. For example, in the case where the driving battery includes fifty battery modules 2 connected to each other in series, they are separated in two blocks each of which contains twenty-five, the same number of battery modules 2. Alternatively, they may be separated in two blocks that contain different numbers, such as twenty-four and twenty-six, of battery modules 2 the total of which is fifty. The battery module 2 includes five nickel-hydrogen batteries connected to each other in series. The driving battery 1 in total includes 250 nickel-hydrogen batteries connected to each other in series, and provides an output voltage of 300 V. The battery module 2 is not limited to include five batteries, but can include four or less, or six or more secondary batteries connected to each other in series. In addition, the driving battery is not limited to include fifty battery modules connected to each other in series, but can include less than, or more than this number of battery modules connected to each other in series.

In the case where the power supply apparatus has fifty battery modules 2 connected to each other in series and detects the voltages by means of the two sets of the voltage detection circuits 3, each voltage detection circuit 3 detects the voltages of twenty-five battery modules 2. The multiplexer 4 of the voltage detection circuit 3 switches the battery modules 2 the voltages of which are detected to detect the voltages of all the battery modules 2 sequentially. Thus, the multiplexer 4 is connected to an input side of the voltage detection portion 5, and sequentially switches the battery modules 2 that are detected by the voltage detection portion 5.

Generally, mutiplexers with the n-th power of 2 channels, such as 2 channels, 4 channels, 8 channels, 16 channels, 32 channels, and 64 channels are often used. In order to switch all the battery modules 2, a multiplexer with a number not less than the number of the battery modules 2 is used as the multiplexer 4. For example, in the case where the voltage detection circuit 3 detects twenty-five battery modules 2, a multiplexer with 32 channels is used as the multiplexer 4. As a result, in most cases, the number of channels of the multiplexer 4 is not equal to the number of the battery modules 2; thus, the number of channels of the multiplexer 4 is larger than the number of the battery modules 2. Consequently, the multiplexer 4 has unused channels.

For example, in the case where the multiplexer 4 with 32 channels switches twenty five battery modules 2, 2nd to 8th channels of the multiplexer 4 are not used to switch the battery modules 2.

The apparatus according to the present invention makes effective use of the remainder channels of the multiplexer 4 that are not used to switch the battery modules 2 for voltage detection necessary to detect the leakage resistance. The voltage detection portion that is connected to the multiplexer 4 also serves for voltage detection to detect the leakage resistance. In the power supply apparatus, since a detection point of a voltage necessary to detect the leakage resistance is connected to a remainder channel of the multiplexer 4, a dedicated voltage detection circuit is not required.

A CPU 12 that is provided inside the power supply apparatus also serves as a calculation circuit that calculates the leakage resistance based on the detected voltage. The power supply apparatus for a vehicle includes the CPU 12 in a battery ECU 9. In addition, the CPU 12 may be included in the voltage detection circuit. The voltage detection circuit 3 including the CPU 12 calculates the remaining amount, and can transmit the remaining amount to the battery ECU 9 through a communication line. The battery ECU 9 including the CPU 12 calculates the remaining amount of the battery modules 2 based on a voltage signal provided from the voltage detection circuit 3, detects over-charging and over-discharging based on the respective voltages of the battery modules 2, controls charging/discharging of the driving battery 1, and additionally calculates the leakage resistance.

Furthermore, in the case where the battery modules 2 are separated in two blocks that contain different numbers such as twenty-four and twenty-six as discussed above, since the numbers for processing in the blocks of the twenty-four side and the twenty-six side are different, software with different processing numbers is required as the software that controls the voltage detection circuit. Even in this case, the software can detect which block it is provided by using the remainder channels of the multiplexer. For example, a circuit that sets a voltage value out of a normal operation range is added to one or more point(s) in the remainder channels in the twenty-four side. In this case, the operations of the software can be changed for the twenty-four side or the twenty-six side by sampling the point(s). The circuit that sets the voltage value can be easily formed of a voltage divider that comprises a resistance. As an alternative method, identification information that identifies the twenty-four side or the twenty-six side is previously written in a nonvolatile memory such as EEPROM.

The aforementioned power supply apparatus detects the leakage resistance with very simple circuit configuration. The voltage detection circuit 3 that detects the voltage of the battery module 2 also serves as a voltage detection circuit that detects the leakage resistance. Particularly, the circuit makes effective use of the remainder channels of the multiplexer 4 that are not used for voltage detection to detect the leakage resistance. Accordingly, it is possible to detect the voltage to calculate the leakage resistance without an additional dedicated circuit that detects the voltage. In the case where the multiplexer has no unused channel, only the voltage detection portion of the voltage detection circuit can additionally serve to detect the voltage to detect the leakage resistance. In this power supply apparatus, only a multiplexer is added, and the voltage detection portion that detects the voltage of the battery module also serves to detect the voltage to detect the leakage resistance. Since the CPU 12 that is provided in the battery ECU 9, or the like, performs processing that detects the leakage resistance based on the detected voltage, a calculation circuit that is dedicated to calculate the leakage resistance based on the detected voltage is not required. However, needless to say, a dedicated calculation circuit may be provided for calculation.

The voltage detection portion 5 comprises a differential amplifier 5A that detects a difference between voltages inputted to a pair of input terminals. In the voltage detection portion 5, one of the input terminals serves as the reference input terminal 11, and the reference input terminal 11 is connected to the particular point 10 of battery module 2. In the driving battery 1, it is preferable that the particular point 10 is an intermediate point corresponding to an intermediate voltage of a plurality of battery modules 2 in the block that separates the battery modules 2. The reference input terminal 11 is connected to this particular point 10. However, the particular point that is connected to the reference input terminal of the voltage detection portion is not limited to an intermediate voltage. The particular point may be a point different from an intermediate voltage, and the reference input terminal of the voltage detection portion can still be connected to the point. In the voltage detection portion 5, another input terminal is connected to an output side of the multiplexer 4. The particular point 10 is connected to a negative side as the reference input terminal 11 of the voltage detection portion 5 comprising the differential amplifier 5A, while the multiplexer 4 is connected to a positive side of the differential amplifier. However, in the voltage detection portion of a differential amplifier, the positive and negative may be inverted to invert its output.

The output of the voltage detection portion is converted into a digital signal by an A/D converter 13. The digital signal is provided to the battery ECU 9 in the state where the output is insulated by an insulating circuit 14, in other words, the A/D converter 13 is disconnected from ground. A photo-MOS relay that optically couples an LED 14a to a phototransistor 14b is used as the insulating circuit 14. A transformer that transmits a signal in a state of disconnection from ground can be used as the insulating circuit.

Figure 4:
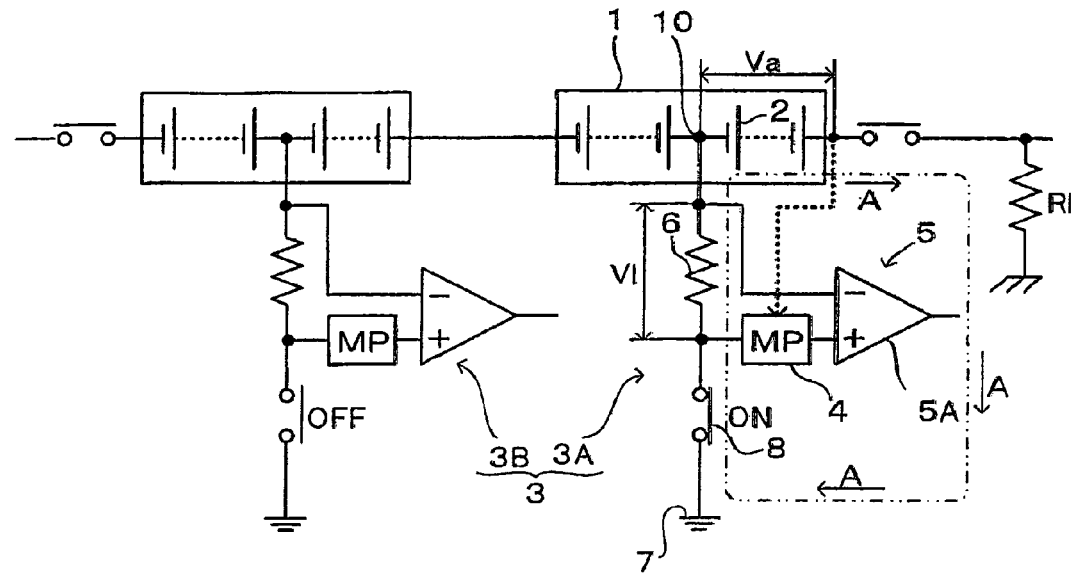
FIG. 4 is a diagram showing the operating principles that a voltage detection circuit in a positive side detects a leakage in a positive side output.

The power supply apparatus detects the leakage resistance on the operating principles shown in FIG. 4.

In this Figure, the voltage detection circuit in the positive side 3A detects the leakage resistance. The voltage detection circuit 3 turns the detection switch 80N when detecting the leakage resistance. The detection switch 8 connects the particular point 10 of battery module 2 to the chassis 7 through the leakage detection resistance 6. If a leakage occurs in the driving battery 1, in other words, if the leakage resistance is not infinite, a leakage current (I) flows through the chassis 7 in a loop shown by arrows A. This leakage current (I) produces a chassis voltage (Vl) between the ends of the leakage detection resistance 6. The chassis voltage (Vl) is detected by the voltage detection portion 5 by switching the multiplexer 4. That is, as shown in FIG. 4, a pair of input terminals are connected to the ends of the leakage detection resistance 6 through the multiplexer 4, and a positive side potential detects the chassis voltage (Vl).

When the chassis voltage (Vl) is detected, the current (I) that flows through the leakage detection resistance 6 is calculated based on the following Equation 1.

$$I = \frac{V_l}{R_c} \quad \text{Equation 1}$$

Where Rc represents an electric resistance of the leakage detection resistance 6.

Since the current that flows through the leakage detection resistance 6 also flows through the leakage resistance, this current (I) produces a voltage (VR) represented by the following Equation 2 between the both ends of the leakage resistance.

$$V_R = R_l \times I = \frac{R_l \times V_l}{R_c} \quad \text{Equation 2}$$

The sum of the voltage between the ends of the leakage resistance and the voltage between the ends of the leakage detection resistance 6 is a positive side output voltage (Va) that is a voltage from the particular point 10 of the driving battery 1 to the positive side. Accordingly, the following equation 3 is formulated.

$$V_a + V_l + V_R + V_l + \frac{R_l \times V_l}{R_c} \quad \text{Equation 3}$$

Based on this Equation, an electric resistance (Rl) of the leakage resistance is calculated by the following Equation 4.

$$R_l = \frac{R_c(V_a - V_l)}{V_l} \quad \text{Equation 4}$$

Where Rc is a known electric resistance of the leakage detection resistance 6, Va is the positive side output voltage from the particular point 10 of the driving battery 1 to the positive side output, and Vl is the chassis voltage. Accordingly, when the chassis voltage is measured, an electric resistance of the leakage resistance can be detected. The positive side output voltage relative to the particular point 10 can be substantially specified without being necessary to measure it. The reason is that the product of the number of the battery modules 2 from the particular point to the positive side output and a voltage of one battery module 2 is the positive side output voltage. On the other hand, the voltage of battery module 2 varies to an extent depending on a charging/discharging state or a current. The positive side output voltage (Va) from the particular point 10 to the positive side output can be accurately detected by switching the multiplexer 4. The positive side output voltage can be accurately measured, thus, the electric resistance of the leakage resistance can be also accurately measured.

In a state where a leakage does not occur in the driving battery 1 in the positive side, in other words, in the state the leakage resistance is infinite, a leakage current does not flow through the leakage detection resistance 6. In this state, since the chassis voltage produced between the leakage detection resistance 6 is 0 V, Vl is 0 in Equation 4, thus, the leakage resistance is infinite. If the leakage resistance calculated in Equation 4 becomes smaller then a prescribed resistance, the aforementioned electric shock problem may arise. For this reason, if the leakage resistance becomes smaller than a first prescribed resistance, the power supply apparatus turns a lamp ON for alerting a driver or a serviceman. If the leakage resistance further decreases smaller than a second prescribed resistance, a contactor is controlled not to be closed. Although the first prescribed resistance is not fixed depending on the output voltage of the driving battery, for example, in the case of a power supply apparatus with an output power rating of 300 V, the first prescribed resistance is set to 100 kΩ to 200 kΩ, preferably about 150 kΩ, and the second prescribed resistance is set to 40 kΩ to 80 kΩ, preferably 50 kΩ to 60 kΩ.

Figure 5:
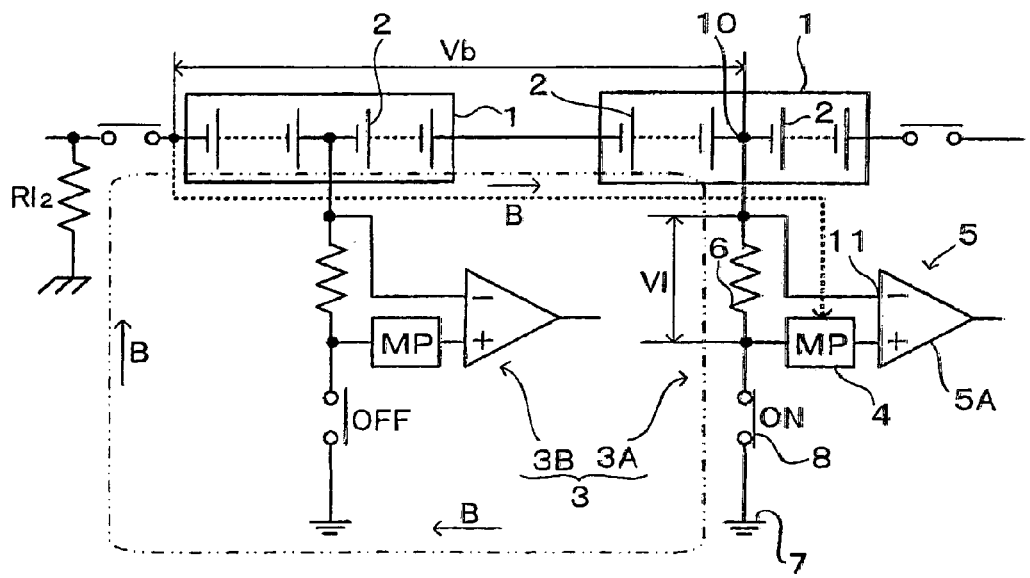
FIG. 5 is a diagram showing the operating principles that the voltage detection circuit in a positive side detects a leakage in a negative side output.

Although FIG. 4 shows the state where a leakage that occurs in the driving battery 1 in the positive side output is detected, a leakage may occur in the driving battery 1 in the negative side output. FIG. 5 shows the operating principles when a leakage in the negative side output is detected. If a leakage occurs in the driving battery 1 in the negative side, a leakage current (I) flows through the chassis 7 in a loop shown by arrows B. In this leakage state, an electric resistance (Rl2) can be calculated by the following Equation 5.

$$R_{l2} = \frac{R_c(V_b - V_l)}{V_l} \quad \text{Equation 5}$$

Where Vb is a negative side output voltage from the particular point 10 to the negative side output. Although this voltage can be substantially specified without being necessary to measure it, it can be accurately detected by switching the multiplexer 4, thus, it is possible to accurately detect the leakage resistance. Although Vl is a voltage that is induced in the leakage detection resistance 6, the direction of this voltage is opposite to the case of FIG. 4. That is, in FIG. 4, the differential amplifier 5A provides a positive output. The reason is that the potential in the chassis side is positive relative to the reference input terminal 11. On the other hand, if a leakage occurs in the negative side through the leakage resistance (Rl2), since a voltage is produced in the opposite direction through the leakage detection resistance 6, the differential amplifier 5A provides a negative output.

If a leakage occurs in the positive side as shown in FIG. 4, the leakage resistance is calculated based on Equation 4. If a leakage occurs in the negative side as shown in FIG. 5, the leakage resistance is calculated based on Equation 5. It is determined which Equations to calculate the leakage resistance to be detected based on the direction of the voltage that is induced in the leakage detection resistance 6, that is, whether the differential amplifier 5A provides a positive or negative output, in other words, whether the potential in the chassis side is positive or negative relative to the reference input terminal 11. If the differential amplifier 5A provides a positive output, a leakage occurs in the positive side, thus, the leakage resistance is calculated based on Equation 4. On the other hand, if the differential amplifier 5A provides a negative output, a leakage occurs in the negative side, thus, the leakage resistance is calculated based on Equation 5.

The aforementioned power supply apparatus has two sets of voltage detection circuits 3. In the case of FIGS. 4 and 5, the voltage detection circuit in the positive side 3A detects the voltages of the battery modules 2 that belong to the block in the positive side in the two divided blocks. The power supply apparatus can also detect the voltages of the battery modules 2 that belong to the block in the negative side in the two divided blocks by means of the voltage detection circuit in the negative side 3B based on the operating principles shown in FIGS. 6 and 7. The power supply apparatus that detects the leakage resistance by means of both the voltage detection circuit in the positive side 3A and the voltage detection circuit in the negative side 3B can detect a leakage resistance even if one of the voltage detection circuits 3 in the positive or negative sides is faulty.

Figure 6:
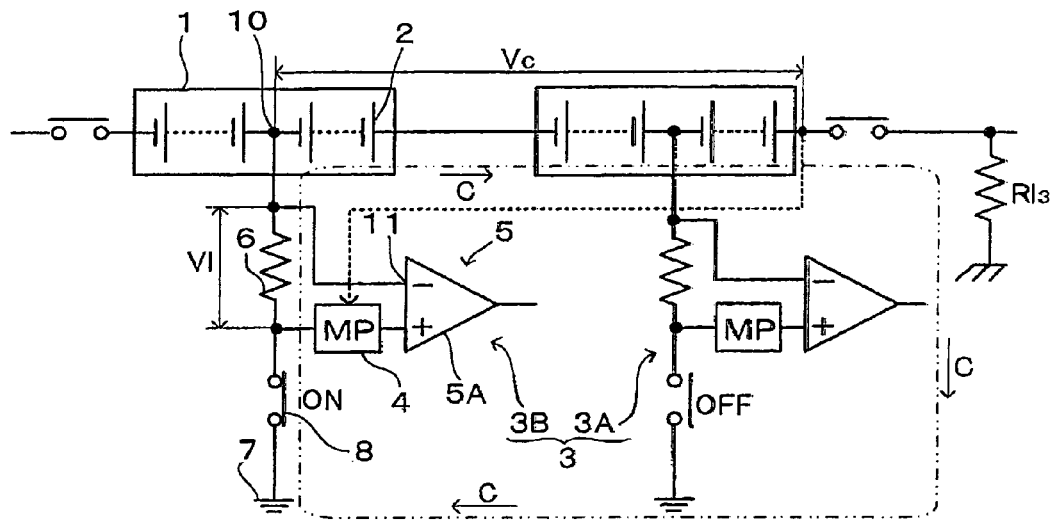
FIG. 6 is a diagram showing the operating principles that a voltage detection circuit in a negative side detects a leakage in a positive side output.

FIG. 6 shows the state where the voltage detection circuit on the negative side 3B detects a leakage that occurs in the positive side output of the driving battery 1. The voltage detection circuit in the negative side 3B detects a leakage resistance in the state where the detection switch 8 that connects the leakage detection resistance 6 to the chassis 7 is turned ON. In this case, the detection switch of the voltage detection circuit in the positive side 3A is kept OFF. In the state where a leakage resistance is not being detected, the switch 8 is always kept OFF to disconnect the driving battery 1 from the chassis 7.

In the state of FIG. 6, if a leakage occurs in the driving battery 1 in the positive side, a leakage current (I) flows through the chassis 7 in a loop shown by arrows C. In this case, an electric resistance (RI3) can be calculated by the following Equation 6.

$$R_{l3} = \frac{R_c(V_c - V_l)}{V_l} \quad \text{Equation 6}$$

Where Vc is a positive side output voltage from the particular point 10 to the positive side output. Although this voltage can be substantially specified without being necessary to measure it, it can be accurately detected by switching the multiplexer 4; thus, it is possible to accurately detect the leakage resistance.

Figure 7:
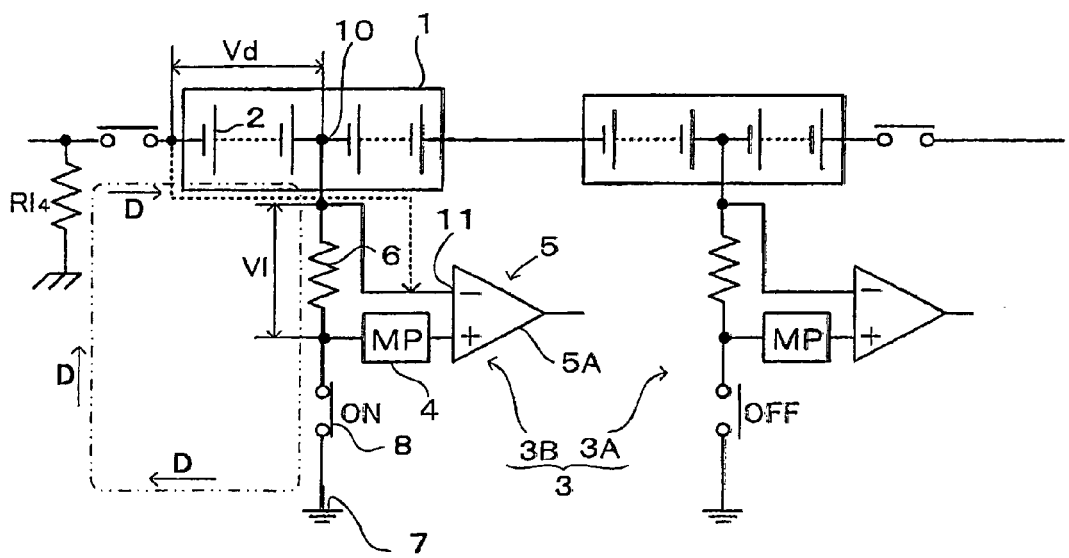
FIG. 7 is a diagram showing the operating principles that a voltage detection circuit in a negative side detects a leakage in a negative side output.

FIG. 7 shows the operating principles when the voltage detection circuit in the negative side 3B detects a leakage in the negative side output. In this state, if a leakage occurs in the driving battery 1 in the negative side, a leakage current (I) flows through the chassis 7 in a loop shown by arrows D. An electric resistance (RI4) can be calculated by the following Equation 7.

$$R_{l4} = \frac{R_c(V_d - V_l)}{V_l} \quad \text{Equation 7}$$

Where Vd is a negative side output voltage from the particular point 10 to the negative side output. Although this voltage can be substantially specified without being necessary to measure it, it can be accurately detected by switching the multiplexer 4, thus, it is possible to accurately detect the leakage resistance.

Although VI in Equation 7 is the chassis voltage that is induced in the leakage detection resistance 6, the direction of this voltage is opposite to the case of FIG. 6. That is, in FIG. 6, the differential amplifier 5A provides a positive output. The reason is that the potential in the chassis side is positive relative to the reference input terminal 11. On the other hand, if a leakage occurs in the negative side through the leakage resistance (RI4), since a voltage is produced in the opposite direction through the leakage detection resistance 6, the differential amplifier 5A provides a negative output.

If a leakage occurs in the positive side as shown in FIG. 6, the leakage resistance is calculated based on Equation 6. If a leakage occurs in the negative side as shown in FIG. 7, the leakage resistance is calculated based on Equation 7. It is determined which Equations to use to calculate the leakage resistance to be detected based on the direction of the voltage that is induced in the leakage detection resistance 6. That is, whether the differential amplifier 5A provides a positive or negative output, in other words, whether the potential in the chassis side is positive or negative relative to the reference input terminal 11. If the differential amplifier 5A provides a positive output, a leakage occurs in the positive side, and, the leakage resistance is calculated based on Equation 6. On the other hand, if the differential amplifier 5A provides a negative output, a leakage occurs in the negative side, and, the leakage resistance is calculated based on Equation 5.

FIG. 3 shows a circuit diagram of a power supply apparatus that detects a leakage in the driving battery 1 in the positive side or negative side on the operating principles as discussed above. In this power supply apparatus, unused channels of the multiplexer 4 shown by solid circles are used for detection of the chassis voltage and for detection of the positive side output voltage or the negative side output voltage relative to the particular point 10. FIG. 3 shows the voltage detection circuit in the positive side 3A in the upper part, and the voltage detection circuit in the negative side 3B in the lower part.

In the voltage detection circuit in the positive side 3A, first and second channels of the multiplexer 4 that are unused and shown by the solid circles are connected as follows.

[First Channel]

The first channel is connected to a connection point between the leakage detection resistance 6 and the detection switch 8.

When the multiplexer 4 is switched to the first channel (1 ch), the voltage detection portion 5 detects the voltage between the t ends of the leakage detection resistance 6. The voltage between the ends of the leakage detection resistance 6 is the voltage of the chassis relative to the particular point 10, i.e., the chassis voltage (VI). Thus, in the state where the multiplexer 4 is switched to the first channel, the voltage detection portion 5 detects the chassis voltage (VI).

[Second Channel]

The second channel is connected to the negative side output of the driving battery 1.

When the multiplexer 4 is switched to the second channel (2 ch), the voltage detection portion 5 detects the negative side output voltage (Vb) relative to the particular point 10. Since this voltage can be specified based on the number of the battery modules 2 connected to each other in series, it can be estimated without being necessary to measure it, but it can be accurately specified when the voltage detection circuit 3 detects it.

In the voltage detection circuit in the negative side 3B shown in the lower part of FIG. 3, first and second channels of the multiplexer 4 that are unused and shown by the solid circles are connected as follows.

[First Channel]

Similarly to the voltage detection circuit in the positive side 3A, the first channel is connected to a connection point between the leakage detection resistance 6 and the detection switch 8.

When the multiplexer 4 is switched to the first channel (1 ch), the voltage detection portion 5 detects the voltage between the ends of the leakage detection resistance 6. The voltage between the ends of the leakage detection resistance 6 is the voltage of the chassis relative to the particular point 10, i.e., the chassis voltage (VI). Thus, in the state where the multiplexer 4 is switched to the first channel, the voltage detection portion 5 detects the chassis voltage (VI).

[Second Channel]

The second channel is connected to the positive side output of the driving battery 1.

When the multiplexer 4 is switched to the second channel (2 ch), the voltage detection portion 5 detects the positive side output voltage (Vc) relative to the particular point 10. Since this voltage can be also specified based on the number of battery modules 2 connected to each other in series, it can be estimated without being necessary to measure it, but it can be accurately specified when the voltage detection circuit 3 detects it.

The multiplexer 4 of the power supply apparatus of FIG. 3 successively switches the channels at a certain period to detect the respective voltages of the battery modules 2 are detected, and to detect the chassis voltage and the positive and negative side output voltages relative to the particular point 10. The multiplexer 4 measures the chassis voltage and the positive and negative side output voltages relative to the particular point 10 at a period of 1 to 5 sec, for example. The CPU 12 of the battery ECU 9 or the CPU included in the voltage detection circuit calculates the leakage resistance by using the detected voltage. Since the power supply apparatus detects the leakage resistance at a period of 1 to 5 sec, if the electric resistance of the leakage resistance becomes smaller than a prescribed resistance, it immediately limits a charging/discharging current or immediately drives the contactor into cutoff for safety use.

A control circuit 15 controls channel switching of the multiplexer 4 and ON/OFF of the detection switch 8. The CPU 12 included in the battery ECU 9 also serves as the control circuit 15, or in the case where the voltage detection circuit includes a CPU, this CPU also serves as the control circuit 15. Alternatively, a dedicated control circuit may be provided. The control circuit 15 turns one detection switch 8 ON, and turns another detection switch 8 OFF when detecting the leakage resistance.

In the case of FIG. 3, when the voltage detection circuit in the positive side 3A measures the leakage resistance, the control circuit 15 turns the detection switch 8 of the voltage detection circuit in the positive side 3A ON, and turns the detection switch 8 of the voltage detection circuit in the negative side 3B OFF. In this state, the control circuit 15 successively switches the first, second, and third channels, and measures the chassis voltage (VI), and the positive and negative side out put voltages (Va) and (Vb) relative to the reference input terminal 11. The leakage resistance is calculated based on Equation 4 or 5 by using the detected chassis voltage (VI), and positive and negative side output voltages (Va) and (Vb). Depending on whether a positive or negative output is provided by the differential amplifier 5A of the voltage detection portion 5, Equation 4 or 5 is used. When the voltage detection portion 5 provides a positive output, the leakage resistance in the positive side output is calculated based on Equation 4, while when the voltage detection portion 5 provides a negative output, the leakage resistance in the negative side output is calculated based on Equation 5.

In the case of FIG. 3, on the other hand, when the voltage detection circuit in the negative side 3B measures the leakage resistance, the control circuit 15 turns the detection switch 8 of the voltage detection circuit in the negative side 3B ON, and turns the detection switch 8 of the voltage detection circuit in the positve side 3A OFF. In this state, the control circuit 15 successively switches the first, second, and third channels, and detects the chassis voltage (VI), and the positive and negative side output voltages (Vc) and (Vd) relative to the reference input terminal 11. The leakage resistance is calculated based on Equation 6 or 7 by using the detected chassis voltage (VI), and positive and negative side output voltages (Vc) and (Vd). When the voltage detection portion 5 provides a positive output, the leakage resistance in the positive side output is calculated based on Equation 6, while when an output of the positive side output voltage is negative, the leakage resistance in the negative side output is calculated based on Equation 7.

In the case where a finite leakage resistance is not detected, the control circuit 15 switches the multiplexer 4 to connection points of the battery modules 2 to detect the voltages of the battery modules 2.

In the power supply apparatus of FIG. 2, a leakage test resistance 16 is connected between the driving battery 1 in the positive side and the chassis 7 through the switching element 17. In the power supply apparatus, in the state where the switching element 17 is turned ON to connect the driving battery 1 to the chassis 7 through the leakage test resistance 16, the leakage resistance is detected. When the voltage detection circuit 3 operates normally and measures the leakage resistance, a value of the measured leakage resistance is equal to or smaller than the leakage test resistance 16. Accordingly, the leakage resistance is detected in this state, thus, it is possible to determine whether the detection of the leakage resistance is performed normally.

In the case of a power supply apparatus that has the battery modules 2 all of which are divided into a plurality of blocks containing different numbers of them and detects the respective voltages of the battery modules 2 by switching the multiplexers 4 with the same channel number, the miltiplexers 4 have unused channels depending on the difference among the numbers of the battery modules 2 that are included therein. For example, in the case of the power supply apparatus that has fifty battery modules 2 all of which are divided into two blocks containing twenty-four and twenty-six battery modules 2, when the divided battery modules 2 corresponding to the blocks are detected by switching them with the muliplexers 4 with the same channel number, one multiplexer 4 has two more unused channels than the other multiplexer 4. The power supply apparatus of FIG. 3 has the battery modules 2 in the negative side shown in the lower part of Figure the number of which is two less than the positive side shown in the upper part of Figure. In this power supply apparatus, the multiplexer 4 in the voltage detection circuit in the negative side 3B has two unused channels (3 ch and 4 ch) as shown by solid circles. These two unused channels are connected to a signal ground (disconnected from a chassis ground). The voltage detection circuit 3 that has unused channels connected to a ground of a power supply circuit provides a voltage of substantially 0 V at the unused channels. Based on an output voltage of 0 V at the unused channels, it is possible to identify whether the voltage detection circuit in the positive side 3A or the voltage detection circuit in the negative side 3B. The voltage detection circuit 3 can use unused channels that are provided a particular reference voltage for identification. However, in the case where the reference voltage is close to the voltage of the battery module, the reference voltage and the voltage of the battery module cannot be discriminated. For this reason, the reference voltage should be set to a different voltage, for example, to lower than or higher than the voltage of the battery module.

Each of the voltage detection circuits 3 stores a signal for identification between positive side and the negative side in EPROM (not shown), for example. Accordingly, as long as the EPROM is under normal operating conditions, a signal provided from the voltage detection circuit 3 can be discriminated between a signal of the voltage detection circuit in the positive side 3A and a signal of the voltage detection circuit in the negative side 3B with the signal stored in the EPROM. However, if the EPROM is out of normal operating conditions due to malfunction, the signal provided from the voltage detection circuit 3 cannot be discriminated between a signal from the voltage detection circuit in the positive side 3A and a signal from the voltage detection circuit in the negative side 3B with the signal in the EPROM. In this case, based on signals provided on the unused channels, it is possible to identify whether a signal from the voltage detection circuit is from the positive side 3A or a signal from the voltage detection circuit is from the negative side 3B. In the power supply apparatus of FIG. 3, the multiplexer 4 of the voltage detection circuit in the negative side 3B has two unused channels. The inputs of the unused channels are connected to the signal ground. Accordingly, when 0 V is provided as voltages of the unused channels, it is possible to identify the voltage detection circuit in the negative side 3B. In the power apparatus of FIG. 3, since the unused channels are connected to a 0 V line, when 0 V is provided from the unused channels, it is possible to identify the voltage detection circuit in the unused channel side. The unused channels are not limited to be connected to the 0 V line, but can be connected to a particular voltage line, such as a 5 V line, thus, it is also possible to identify the voltage detection circuit in the unused channel side. According to this construction, in the case where this function is achieved by software, when software has the identification function, common software can be applied to the two sets of the voltage detection circuits.

As discussed above, since a power supply apparatus according to this embodiment can detect a leakage resistance with the voltage detection circuit in the positive side 3A and with the voltage detection circuit in the negative side 3B independently, if one of the leakage detection resistances in the voltage detection circuit in the positive side 3A or the voltage detection circuit in the negative side 3B is out of normal operating conditions due to a malfunction, the other voltage detection circuit under normal operating conditions can measure the leakage resistance. In this embodiment, in the case where both the voltage detection circuit in the positive side 3A and the voltage detection circuit in the negative side 3B operate under normal operating conditions, the leakage resistance can be detected by a leakage detection method according to a previous application (Japanese Patent Application TOKUGAN No. 2004-160344) by the applicant. The following description will describe this leakage detection method.

This leakage detection method accurately detects the leakage resistance RI with a leakage detection circuit shown in FIGS. 8 to 10 as discussed below. The leakage detection circuit shown in these Figures can be achieved by a power supply apparatus according to the present invention that has the circuit configuration shown in FIG. 11. The circuit shown in FIG. 11 corresponds to the voltage detection circuit in the positive side 3A, in the state where the multiplexer 4 switches to 1 ch, that has a leakage resistance Ra and a leakage detection switch SW1 substituted for the leakage detection resistance 6 and the detection switch 8, respectively, and a leakage resistance Rb provided in the chassis side relative to the detection switch 8, and to the voltage detection circuit in the negative side 3B, in the state where the multiplexer 4 switches to 1 ch, that has a leakage resistance Ra and a leakage detection switch SW2 substituted for the leakage detection resistance 6 and the detection switch 8, respectively, and a leakage resistance Rb provided in the chassis side relative to the detection switch 8, in the circuit shown in FIG. 3. Although current detection circuits 30' that detect leakage currents are shown in FIG. 8, as discussed later, the leakage currents is only used for calculation, thus, they are not used in practice.

Figure 8:
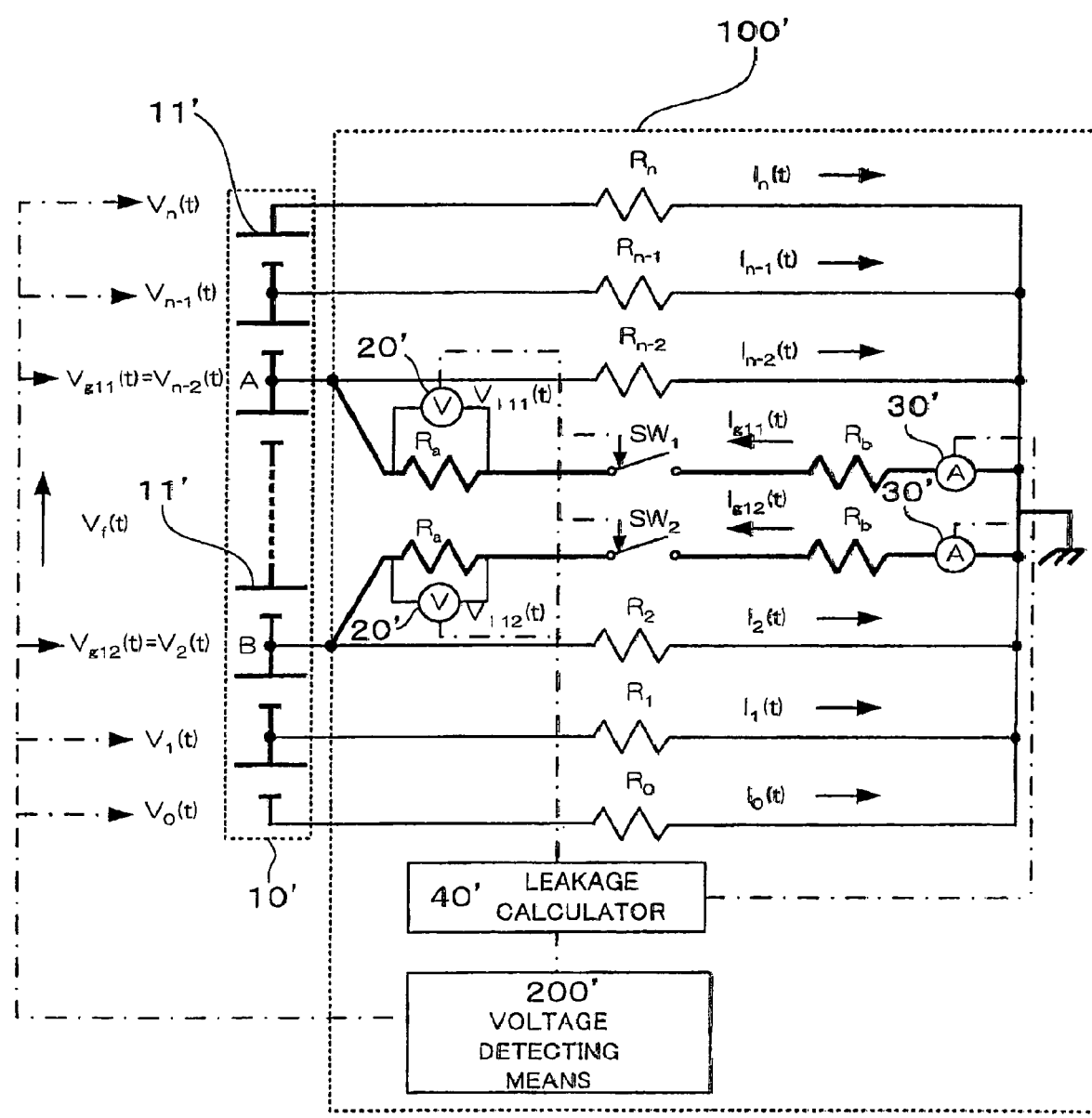
FIG. 8 is a circuit diagram showing a leakage detection circuit that is used in a leakage detection method according to a previous application by the applicant.
Figure 9:
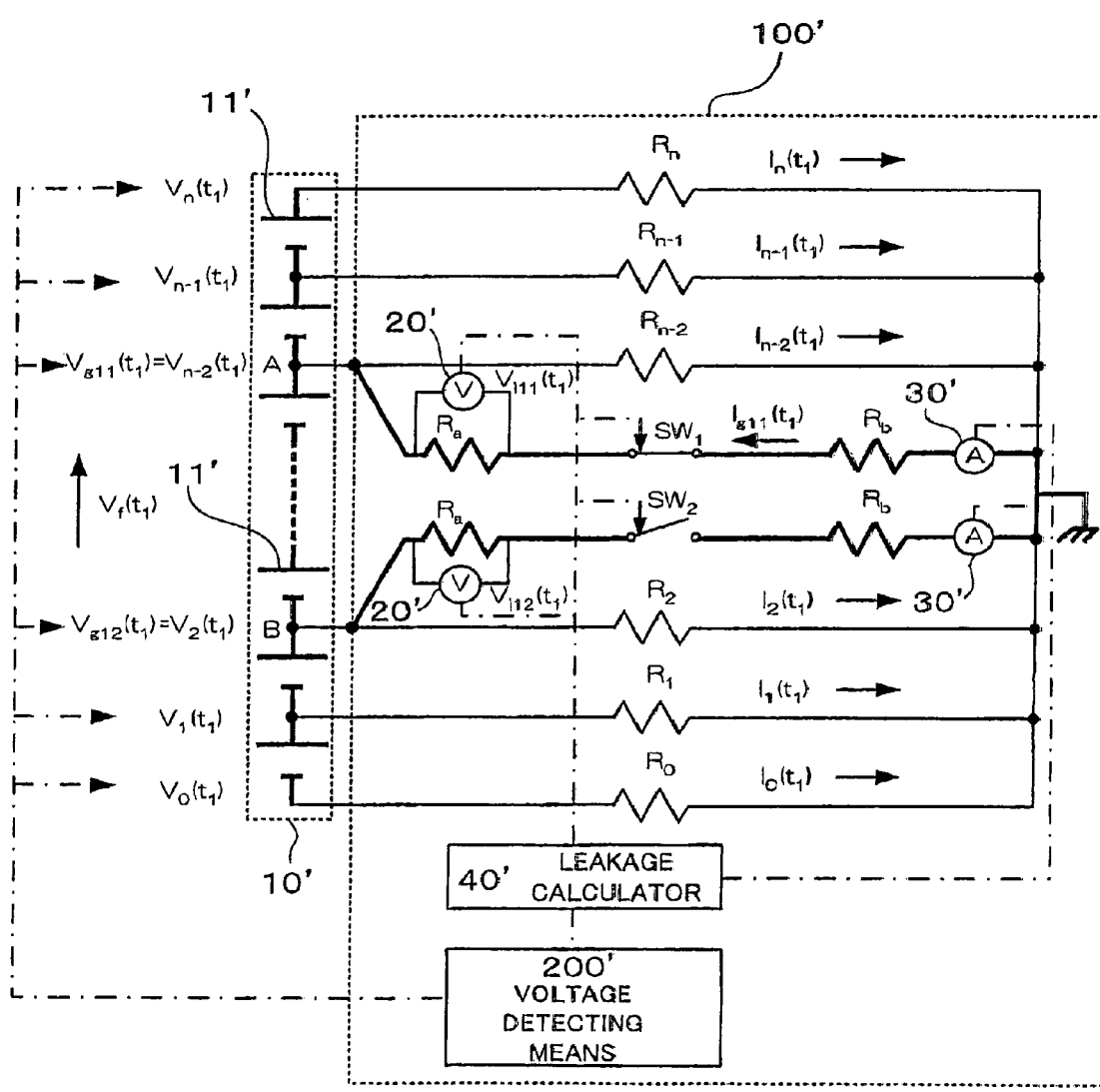
FIG. 9 is a circuit diagram showing operation in the circuit of FIG. 8 at time t1.
Figure 10:
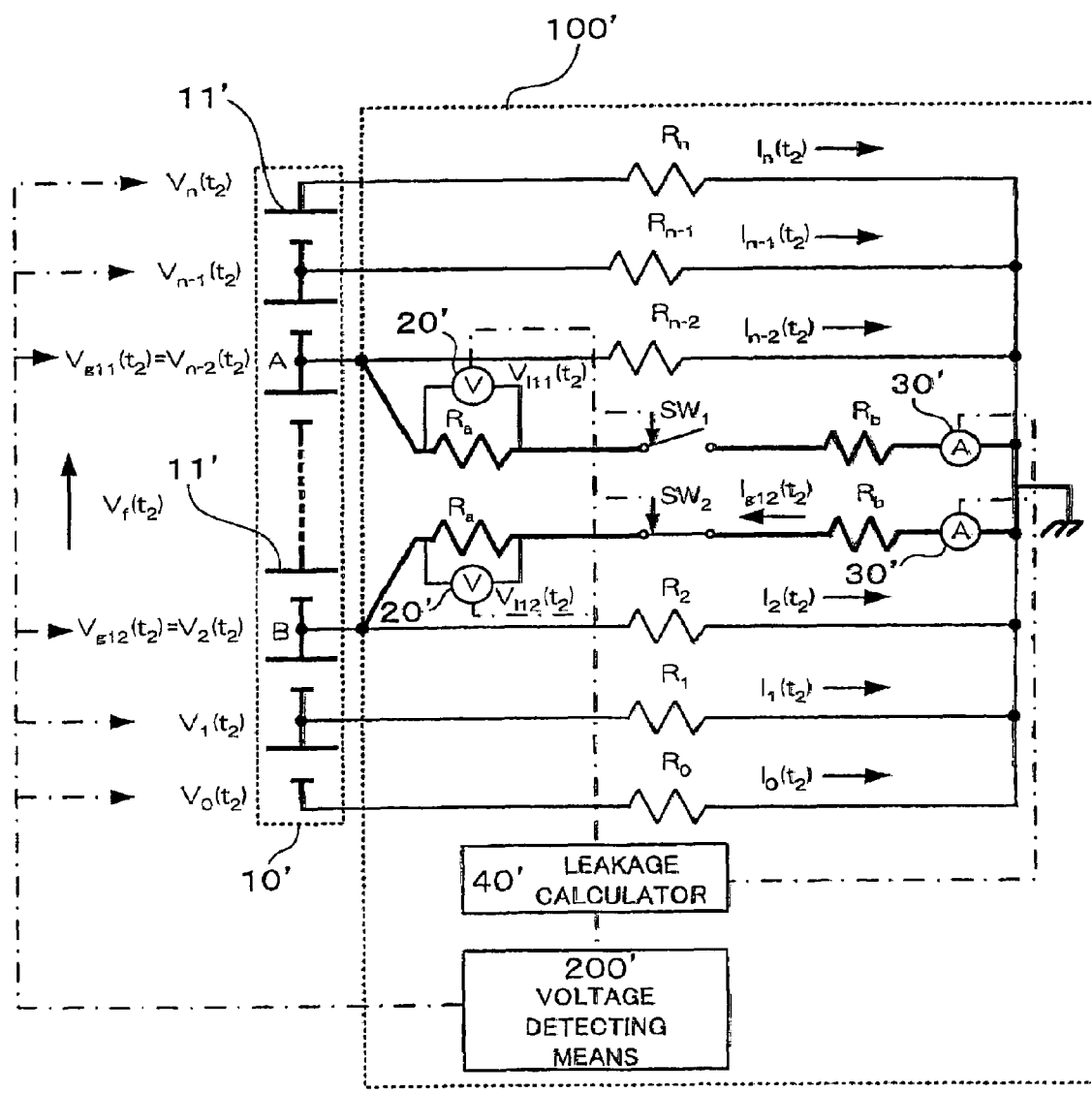
FIG. 10 is a circuit diagram showing operation in the circuit of FIG. 1 at time t2.
Figure 11:
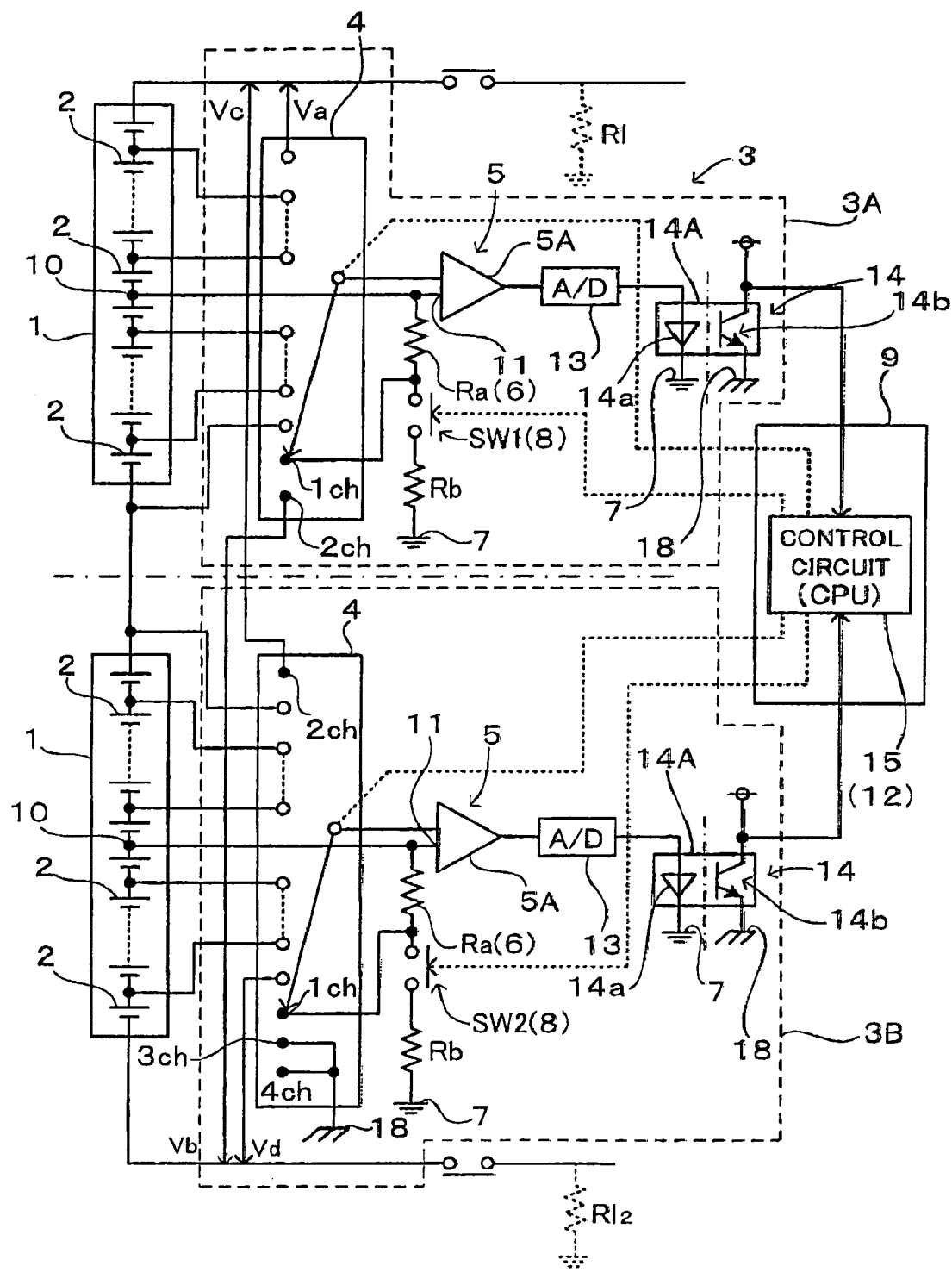
FIG. 11 is a circuit diagram showing one example of the leakage detection circuit shown in FIG. 8 that is achieved by using the power supply apparatus shown in FIG. 3.

A leakage detection circuit 100' of FIGS. 8 to 10 is a leakage detection circuit for detection of a battery pack 10' for an electric vehicle comprising the battery pack 10' including a plurality of batteries 11' that are connected to each other in series; leakage detection resistances Ra and Rb that are connected in series between a ground, and each of battery terminals of the batteries 11' at two arbitrary locations in the high and low voltage sides, respectively; voltage detecting means 200' that detects voltages of the battery terminals in the high and low voltage sides as $Vg11(t)$ and $Vg12(t)$, respectively, at timing t; leakage detection switches SW1 and SW2 each of which is connected in series between the leakage detection resistances Ra and Rb; and voltage detectors 20' and 20' that detect a voltage $VI11(t)$ produced in the leakage detection resistance Ra connected to the leakage detection switch SW1, when one leakage detection switch SW1 connected to the battery terminal in the high voltage side is closed at time t and the other leakage detection switch SW2 is opened, and detects a voltage $VI12(t)$ produced in the leakage detection resistance Ra connected to the leakage detection switch SW2, when the other leakage detection switch SW2 connected to the battery terminal in the low voltage side is closed at time t and the one leakage detection switch SW1 is opened. The circuit further comprises a leakage calculator 40' that calculates a combined value RI of the leakage resistances based on the following equation 8.

$$R_l = \frac{R_a}{\frac{V_{l12}(t_2)}{V_{g11}(t_2) - V_{g12}(t_2)} - \frac{V_{l11}(t_1)}{V_{g11}(t_1) - V_{g12}(t_1)}} - (R_a + R_b) \quad \text{Equation 8}$$

Where t1 and t2 are different time values.

According to this construction, it is possible to easily obtain a leakage resistance value, and to calculate a leakage resistance value of the whole circuit even if leakage occurs at two or more locations.

In addition, this leakage detection circuit 100' further comprises a measurer that measures a terminal voltage VT(t) between the both ends of the battery pack 10' at time t, and in the case where leakage occurs at one of the locations, at time t, where VI(t) is the voltage of the battery terminal in which the leakage occurs, and this voltage is represented by KIVT(t) by using the terminal voltage VT(t) and a proportionality constant KI, the leakage calculator 40' calculates kI based on the following equation 9 and estimates the leakage portion based on kI.

$$k_l = \frac{\frac{V_{l11}(t_1)}{R_a}(R_l + R_a + R_b + V_{g11}(t_1)}{V_T(t_1)} \qquad \text{Equation 9}$$

$$0 \leq k_l \leq 1$$

According to this construction, it is possible to detect not only a leakage resistance value, but a leakage location.

As discussed above, the method for detecting a leakage resistance can calculate information about leakage based on the particular equation. In addition, since it is not necessary to attach a special device thereto, they are easily applied to existing facilities. Therefore, it is possible to detect the leakage resistance value, the leakage location, and so on, and, thus, to quickly take necessary measures. This can provide safer use of electric vehicles.

The leakage detection circuit 100' and the leakage detection method using this circuit are now described.

The leakage detection circuit 100' shown in FIG. 8 is added to a battery pack 10' including n batteries 11' connected to each other in series. For ease of explanation, a circuit for charging/discharging the battery pack 10' is not illustrated. The battery 11' is shown as a unit cell in the Figure, but may include a plurality of cells connected to each other in series or in parallel.

This leakage detection circuit 100' includes a voltage detection means 200' that can detect respective voltages V0-Vn in terminal locations of batteries 11' at prescribed timing. Voltages detected by the voltage detection means 200' at time t are VOLt)-Vn(+). In this case, V0($t$), V1($t$), V2($t$), . . . , Vn−1(t), and Vn(t) are potentials relative to V0($t$). If leakage occurs in any of the batteries 11', electric currents flow from the respective terminal of the leaked batteries 11' to a ground. Accordingly, a circuit in which the terminal of each battery 11' connected to a ground (in this case, chassis of vehicle) via each of leakage resistances R0-Rn serves as an equivalent circuit of leakage. In addition, it is assumed that currents I0-In flow the leakage resistances R0-Rn, respectively. Currents detected by a current detector at time t are I0(+)-In(+), I0-In(t1,t2) represent I0-In(t1) or I0-In(t2).

The leakage detection resistance Ra, a leakage detection switch SW1 or SW2, and the leakage detection resistance Rb are connected in series between each of two terminals A and B at arbitrary locations in the high and low voltage sides and a ground. The battery terminals A and B may be both ends of the battery pack 10'. The resistance values of leakage detection resistances Ra and Rb connected to the points A and B are equal. The leakage detection switches SW1 and SW2 can open and close independently. In the illustration of FIG. 8, Ig11($t_1$) is a current that flows through the leakage detection resistances Ra and Rb when the leakage detection switch SW1 connected to the point A is closed at time t1, while Ig11($t_2$) is a current that flows through the leakage detection resistances Ra and Rb when it is closed at time t2. In addition, Ig12($t_1$) is a current that flows through the leakage detection resistances Ra and Rb when the leakage detection switch SW2 connected to the point B is closed at time t1, while Ig12($t_2$) is a current that flows through the leakage detection resistances Ra and Rb when it is closed at time t2. In this case, the currents are detected by current detectors 30'. Additionally, VI11($t_1$), VI11($t_2$), VI12($t_1$), and VI12($t_2$) are voltages at the points A and B detected by voltage detectors 20' at timing t1 and t2, respectively. Where R is the combined resistance of the leakage detection resistances Ra and Rb, and Vf(t1,t2) is the voltage between A and B, the following Equations 10 are formulated.

$$R = R_a + R_b$$

$$V_{I1}(t_1) = R_a \cdot I_{g11}(t_1)$$

$$V_{I12}(t_2) = R_a \cdot I_{g12}(t_2)$$

$$V_f(t_1) = V_{g11}(t_1) - V_{g12}(t_1)$$

$$V_f(t_2) = V_{g11}(t_2) - V_{g12}(t_2) \qquad \text{Equation 10}$$

In this case, Vg11($t$) is the voltage (Vn−2 (t) in FIG. 8) in the aforementioned battery terminal A, while Vg12(t) is the voltage (V2(t) in FIG. 8) in the aforementioned battery terminal B. As discussed later, when the above equations are applied, the leakage resistance value RI of FIG. 8 can be represented by the following Equation 11.

$$R_l = \left(\sum_{i=0}^{n} \frac{1}{R_i}\right)^{-1} = \frac{R_a}{\frac{V_{I12}(t_2)}{V_f(t_2)} - \frac{V_{I11}(t_1)}{V_f(t_1)}} - R \qquad \text{Equation 11}$$

The leakage detection circuit of FIG. 8 further includes the leakage calculator 40' that detects leakage and calculates a leakage resistance or detects a leakage location. The leakage calculator 40' can be configured by hardware of gate arrays (FPGA, ASIC, and so on) or by software. The circuit may have a display portion that can display the leakage resistance value, the leakage location, and so on, as a calculation result. A 7-segment display with LEDs, an LCD monitor, or the like, can be used as the display portion.

The procedure formulating the foregoing Equations is now described. First, at time t1, as shown in FIG. 9, when the leakage detection switch SW2 is opened and the leakage detection switch SW1 is closed, a total of the leakage currents is Ig11($t1$) that flows through the leakage detection resistance Ra connected to the point A. Accordingly, Ig11($t1$) is represented by the following Equation 12.

$$I_{g11}(t_1) = I_n(t_1) + I_{n-1}(t_1) + I_{n-2}(t_1) + \ldots + I_2(t_1) + I_1(t_1) + I_0(t_1) \qquad \text{Equation 12}$$

On the other hand, a current In(t1) that flows through the leakage resistance Rn can be obtained by the following Equation 13. Where R=Ra+Rb as discussed above.

$$I_n(t_1) = \frac{\{V_n(t_1) - V_o(t_1)\} - \{(V_{g11}(t_1) - V_o(t_1)) + RI_{g11}(t_1)\}}{R_n}$$

$$= \frac{V_n(t_1) - (V_{g11}(t_1) + RI_{g11}(t_1))}{R_n} \qquad \text{Equation 13}$$

Ig11($t1$) can be represented by the following Equation 14 by applying the foregoing Equations 12 and 13.

$$I_{g11}(t_1) = \frac{V_n(t_1) - (V_{g11}(t_1) + RI_{g11}(t_1))}{R_n} + \frac{V_{n-1}(t_1) - (V_{g11}(t_1) + RI_{g11}(t_1))}{R_{n-1}} + \frac{V_{n-2}(t_1) - (V_{g11}(t_1) + RI_{g11}(t_1))}{R_{n-2}} + \qquad \text{Equation 14}$$

$$\ldots + \frac{V_2(t_1) - (V_{g11}(t_1) + RI_{g11}(t_1))}{R_2} +$$

$$\frac{V_1(t_1) - (V_{g11}(t_1) + RI_{g11}(t_1))}{R_1} +$$

$$\frac{V_o(t_1) - (V_{g11}(t_1) + RI_{g11}(t_1))}{R_o}$$

As a result, the foregoing Equation 14 is transformed, thus, $Ig11(t1)$ can be represented by the following Equation 15.

$$I_{g11}(t_1) = \sum_{i=0}^{n} \frac{V_i(t_1)}{R_i} - V_{g11}(t_1) \sum_{i=0}^{n} \frac{1}{R_i} - RI_{g11}(t_1) \sum_{i=0}^{n} \frac{1}{R_i} \qquad \text{Equation 15}$$

On the other hand, at time t2, as shown in FIG. 10, when the leakage detection switch SW1 is opened and the leakage detection switch SW2 is closed, a total of the leakage currents is $Ig12(t2)$ that flows through the leakage detection resistance Ra connected to the point B. Accordingly, $Ig12(t2)$ is represented by the following equation 16.

$$Ig_{12}(t_2) = I_n(t_2) + I_{n-1}(t_2) + I_{n-2}(t_2) + \ldots + I_2(t_2) + I_1(t_2) + I_0(t_2) \qquad \text{Equation 16}$$

As discussed above, based on a current $In(t2)$ that flows through the leakage resistance Rn, the foregoing Equation 16 is transformed to the following Equation 17.

$$I_{g12}(t_2) = \frac{V_n(t_2) - (V_{g12}(t_2) + RI_{g12}(t_2))}{R_n} + \qquad \text{Equation 17}$$

$$\frac{V_{n-1}(t_2) - (V_{g12}(t_2) + RI_{g12}(t_2))}{R_{n-1}} +$$

$$\ldots + \frac{V_1(t_2) - (V_{g12}(t_2) + RI_{g12}(t_2))}{R_1} +$$

$$\frac{V_0(t_2) - (V_{g12}(t_2) + RI_{g12}(t_2))}{R_o}$$

As a result, the foregoing Equation 17 is transformed, thus, the current $Ig12(t2)$ can be represented by the following Equation 18.

$$I_{g12}(t_2) = \sum_{i=0}^{n} \frac{V_i(t_2)}{R_i} - V_{g12}(t_2) \sum_{i=0}^{n} \frac{1}{R_i} - RI_{g12}(t_2) \sum_{i=0}^{n} \frac{1}{R_i} \qquad \text{Equation 18}$$

In this case, it is regarded that a location where leakage occurs and a leakage resistance do not vary during the detection irrespective of time. Since the location where leakage occurs does not vary even when the leakage detection switches SW1 and SW2 are switched, the following Equation 19 is formulated.

In this case, it is assumed that leakage occurs in a sufficiently high leakage resistance value range. Irrespective of occurrence of leakage, an extent of leakage, in the case where a location in which leakage occurs does not vary, $Vi(t)$ at an arbitrary terminal location can be represented by a product of a later-discussed terminal voltage $VT(t)$ and a proportionality constant $ki$. At times t1 and t2, Vi at the same terminal location and the terminal voltage VT may vary, but the proportionality constant $ki$ does not vary. Accordingly, the following Equation 19 is formulated.

$$V_i(t_1) = k_i(V_n(t_1) - V_o(t_1)) = k_i V_T(t_1)$$

$$V_i(t_2) = k_i(V_n(t_2) - V_o(t_2)) = k_i V_T(t_2)$$

$$(0 \leq k_i \leq 1) \qquad \text{Equation 19}$$

In this case, VT(t) represents a terminal voltage between the terminals of the battery pack 10', i.e., a total voltage. Accordingly, since the batteries 11' are connected to each other in series, the foregoing Equations 15 and 18 can be transformed to the following Equations 20 and 21 by applying the foregoing Equation 19. In this detection method, the voltage detection means 200' detects the voltage Vn(t) and V0(t), and the leakage calculator 40' calculates their difference, thus, the terminal voltage VT(t) can be obtained. That is, the terminal voltage VT(t) is detected by circuitry of the voltage detection means 200' and the leakage calculator 40'. Instead of this circuitry, a circuit that directly detects the terminal voltage VT(t) may be provided and detect it to provide a detected value to the leakage calculator 40'.

$$I_{g11}(t_1) = V_T(t_1) \sum_{i=0}^{n} \frac{k_i}{R_i} - V_{g11}(t_1) \sum_{i=0}^{n} \frac{1}{R_i} - RI_{g11}(t_1) \sum_{i=0}^{n} \frac{1}{R_i} \qquad \text{Equation 20}$$

$$I_{g12}(t_2) = V_T(t_2) \sum_{i=0}^{n} \frac{k_i}{R_i} - V_{g12}(t_2) \sum_{i=0}^{n} \frac{1}{R_i} - RI_{g12}(t_2) \sum_{i=0}^{n} \frac{1}{R_i} \qquad \text{Equation 21}$$

The foregoing Equation 20 can be transformed to the following Equation 22.

$$\sum_{i=0}^{n} \frac{k_i}{R_i} = \frac{I_{g11}(t_1) + V_{g11}(t_1) \sum_{i=0}^{n} \frac{1}{R_i} + RI_{g11}(t_1) \sum_{i=0}^{n} \frac{1}{R_i}}{V_T(t_1)} \qquad \text{Equation 22}$$

Substituting the Equation 22 into the Equation 21 provides the following Equation 23.

$$\left( \sum_{i=0}^{n} \frac{1}{R_i} \right)^{-1} = \frac{\frac{V_{g11}(t_1)}{V_T(t_1)} - \frac{V_{g12}(t_2)}{V_T(t_2)}}{\frac{I_{g12}(t_2)}{V_T(t_2)} - \frac{I_{g11}(t_1)}{V_T(t_1)}} - R \qquad \text{Equation 23}$$

In this case, since the locations of $Vg11(t1)$ and $Vg12(t2)$ do not vary irrespective of the total voltages of VT(t1), and VT(t2), the following Equation 24 is formulated.

$$mV_T(t_1) = V_{g11}(t_1) - V_{g12}(t_1) \qquad \text{Equation 24}$$

$$mV_T(t_2) = V_{g11}(t_2) - V_{g12}(t_2)$$

$$(0 \leq m \leq 1)$$

$$\frac{V_{g12}(t_2)}{V_T(t_2)} = \frac{V_{g12}(t_1)}{V_T(t_1)} = \varepsilon$$

Where $\varepsilon$ is a constant.

As a result, the foregoing Equation 23 can be further transformed to the following Equation 25.

$$\left(\sum_{i=0}^{n} \frac{1}{R_i}\right)^{-1} = \frac{\frac{V_{g11}(t_1)}{V_T(t_1)} - \frac{V_{g12}(t_1)}{V_T(t_1)}}{\frac{I_{g12}(t_2)}{V_T(t_2)} - \frac{I_{g11}(t_1)}{V_T(t_1)}} - R \quad \text{Equation 25}$$

$$= \frac{\frac{V_{g11}(t_1) - V_{g12}(t_1)}{V_T(t_1)}}{\frac{I_{g12}(t_2)}{V_T(t_2)} - \frac{I_{g11}(t_1)}{V_T(t_1)}} - R$$

$$= \frac{m \frac{V_{g11}(t_1) - V_{g12}(t_1)}{V_{g11}(t_1) - V_{g12}(t_1)}}{\frac{mI_{g12}(t_2)}{V_{g11}(t_2) - V_{g12}(t_2)} - \frac{mI_{g11}(t_1)}{V_{g11}(t_1) - V_{g12}(t_1)}} - R$$

In this case, the following Equations 26 to 29 are formulated.

$$I_{g11}(t_1) = \frac{V_{l11}(t_1)}{R_a} \quad \text{Equation 26}$$

$$I_{g12}(t_2) = \frac{V_{l12}(t_2)}{R_a} \quad \text{Equation 27}$$

$$V_{g11}(t_1) - V_{g12}(t_1) = V_f(t_1) \quad \text{Equation 28}$$

$$V_{g11}(t_2) - V_{g12}(t_2) = V_f(t_2) \quad \text{Equation 29}$$

Accordingly, substituting the foregoing Equations 26 to 29 into Equation 25 provides the following Equation 30, that is, RI of Equation 11 can be obtained.

$$\left(\sum_{i=0}^{n} \frac{1}{R_i}\right)^{-1} = \frac{R_a}{\frac{V_{l12}(t_2)}{V_f(t_2)} - \frac{V_{l11}(t_1)}{V_f(t_1)}} - R \quad \text{Equation 30}$$

As discussed above, the combined resistance value of the leakage resistances can be calculated. The leakage calculator 40' compares this calculated leakage resistance with a prescribed value. When it is smaller than the prescribed value, measures, such as warning sign, will be taken. On the other hand, in the case where leakage occurs at one location, it is possible to calculate not only the resistance value but also a portion where leakage occurs. In the case where it is assumed that leakage occurs at only a point 1, if it is considered that leakage resistance values other than the point I are infinite, the following equation 31 is formulated (where 0≦I≦n).

$$R_0 = R_1 = \ldots R_{I-1} = R_{I+1} \ldots = R_{n-1} = R_n = \infty \quad \text{Equation 31}$$

In this case, the foregoing equation 20 is transformed, and Ig11(t1) is calculated, thus, the following equation 32 is formulated.

$$I_{g11}(t_1) = \frac{V_T(t_1) \sum_{i=0}^{n} \frac{k_i}{R_i} - V_{g11}(t_1) \sum_{i=0}^{n} \frac{1}{R_i}}{1 + R \sum_{i=0}^{n} \frac{1}{R_i}} \quad \text{Equation 32}$$

Equation 32 is substituted into the foregoing Equation 10, thus, the following Equation 33 is formulated.

$$V_{l11}(t_1) = R_a \cdot I_{g11}(t_1) \quad \text{Equation 33}$$

$$= R_a \cdot \frac{V_T(t_1) \sum_{i=0}^{n} \frac{k_i}{R_i} - V_{g11}(t_1) \sum_{i=0}^{n} \frac{1}{R_i}}{1 + R \sum_{i=0}^{n} \frac{1}{R_i}}$$

This equation is expanded where 1/∞=0 in consideration of Equation 31, thus, kI can be calculated by the following Equation 34.

$$k_I = \frac{\frac{V_{l11}(t_1)}{R_a}(R_I + R) + V_{g11}(t_1)}{V_T(t_1)} \quad \text{Equation 34}$$

$$0 \leq k_I \leq 1$$

The denominator VT(t1) of the above equation is Vn(t1)-V0(t1) based on the Equation 19.

Accordingly, RI is calculated from the detected values based on the foregoing Equation 30, thus, the value kI can be calculated from the above Equation 34. As shown in the foregoing Equation 19, the proportionality constant kI equals to the proportionality constant KI to be multiplied in the representation of the voltage VI(t)(=KIVT(t)) at the battery terminal to which the leakage resistance RI is connected. As a result, this proportionality constant kI represents the location of the battery terminal to which the leakage resistance RI is connected, thus, it is possible to detect a portion where leakage occurs based on this value. Although the aforementioned method can correctly calculate kI in the case where leakage occurs at one location, it is difficult to detect a portion where leakage occurs in the case where it occurs at two or more locations. However, even in this case, the combined value of the leakage resistances of the whole circuit can be calculated based on the foregoing Equation 30.

The leakage calculator 40' calculates kI that represents the leakage resistance RI and a portion where leakage occurs, and transmits the calculation result for other processes if necessary, or the display portion displays it. In this method, information about leakage can be obtained only by calculation based on the detected values at two points in time. Therefore, it is possible to provide excellent features that can detect leakage very easily, and apply this method to existing facilities without attaching special hardware.

As this invention may be embodied in several forms without departing from the spirit of essential characteristics thereof, the present embodiment is therefore illustrative and not restrictive, since the scope of the invention is defined by the claims rather than by the description preceding them, and all changes that fall within metes and bounds of the claims, or equivalence of such metes and bounds thereof are therefore intended to be embraced by the claims. This application is based on applications No. 2004-199861 filed in Japan on Jul. 6, 2004, the content of which is incorporated hereinto by reference.

What is claimed is:

1. A power supply apparatus for a vehicle, the power supply apparatus comprising:

a driving battery including a plurality of battery modules that are connected to each other in series, said driving battery to be connected to a chassis of the vehicle via a leakage detection resistance; and a voltage detection circuit operable to detect a voltage of said driving battery, said voltage detection circuit comprising:

a multiplexer having a plurality of channels, with a number of said plurality of channels being not less than a number of said plurality of battery modules of said driving battery, said multiplexer being operable to switch one of said plurality of battery modules of said driving battery of which a voltage is to be detected; and a voltage detection portion operable to detect a voltage of one of said plurality of battery modules of said driving battery switched to by said multiplexer;

wherein said voltage detection circuit is operable to detect a chassis voltage induced across said leakage detection resistance by switching to one of said plurality of channels of said multiplexer of said voltage detection circuit which is not in use for switching said plurality of battery modules of said driving battery, thereby detecting a leakage resistance based on said chassis voltage.

2. The power supply apparatus according to claim 1, further comprising a detection switch in said voltage detection circuit operable to connect said driving battery to the chassis of the vehicle through said leakage detection resistance.

3. The power supply apparatus according to claim 1, wherein said multiplexer of said voltage detection circuit is further operable to switch an input of said voltage detection portion between a positive side of said driving battery and a negative side of said driving battery, and said voltage detection circuit is further operable to detect a positive side output voltage of said driving battery, operable to measure a negative side output voltage of said driving battery, and operable to calculate said leakage resistance based on said positive side output voltage, said negative side output voltage, and said chassis voltage induced across said leakage detection resistance.

4. The power supply apparatus according to claim 1, wherein said driving battery comprises a first driving battery, and said voltage detection circuit comprises a first voltage detection circuit, further comprising:

a second driving battery including a second plurality of battery modules that are connected to each other in series, said second driving battery being operable to be connected to a chassis of the vehicle via a second leakage detection resistance; and a second voltage detection circuit operable to detect a voltage of said second driving battery, said second voltage detection circuit comprising:

a second multiplexer having a plurality of channels, with a number of said plurality of channels being not less than a number of said second plurality of battery modules of said second driving battery, said second multiplexer being operable to switch one of said second plurality of battery modules of said second driving battery of which a voltage is to be detected; and a second voltage detection portion operable to detect a voltage of one of said second plurality of battery modules of said second driving battery switched to by said second multiplexer;

wherein said second voltage detection circuit is operable to detect a second chassis voltage induced across said second leakage detection resistance by switching to one of said plurality of channels of said second multiplexer of said second voltage detection circuit which is not in use for switching said second plurality of battery modules of said second driving battery, thereby detecting a leakage resistance based on said second chassis voltage.

5. The power supply apparatus according to claim 4, wherein said first voltage detection circuit is further operable to detect a positive side output voltage of at least one of said first driving battery and said second driving battery and operable to detect a negative side output voltage of at least one of said first driving battery and said second driving battery.

6. The power supply apparatus according to claim 1, wherein said driving battery comprises a first driving battery, and said voltage detection circuit comprises a first voltage detection circuit, further comprising:

a second driving battery including a second plurality of battery modules that are connected to each other in series, said second driving battery being operable to be connected to a chassis of the vehicle via a second leakage detection resistance; and a second voltage detection circuit operable to detect a voltage of said second driving battery, said second voltage detection circuit comprising:

a second multiplexer having a plurality of channels, with a number of said plurality of channels being not less than a number of said second plurality of battery modules of said second driving battery, said second multiplexer being operable to switch one of said second plurality of battery modules of said second driving battery of which a voltage is to be detected; and a second voltage detection portion operable to detect a voltage of one of said second plurality of battery modules of said second driving battery switched to by said second multiplexer.

7. The power supply apparatus according to claim 6, wherein each of said first voltage detection circuit and said second voltage circuit is further operable to detect a positive side output voltage of at least one of said first driving battery and said second driving battery and operable to detect a negative side output voltage of at least one of said first driving battery and said second driving battery.

8. The power supply apparatus according to claim 1, further comprising:

a switching element operable to connect said driving battery and the chassis of the vehicle via a leakage test resistance, wherein said voltage detection unit is further operable to measure a voltage across said leakage test resistance.

9. The power supply apparatus according to claim 1, wherein the voltage detection circuit is operable to detect a voltage of one of said plurality of battery modules of said driving battery relative to a voltage of a particular point of said driving battery.

10. The power supply apparatus according to claim 1, wherein said voltage detection portion includes a plurality of input terminals, wherein a first one of said plurality of input terminals is operable to serve as a reference input terminal connected to a particular point of said driving battery, and wherein a second one of said plurality of input terminals is operable to connect to an output side of said multiplexer.

11. The power supply apparatus according to claim 1, wherein said voltage detection portion includes a differential amplifier operable to detect a difference between voltages inputted to a pair of input terminals.

12. The power supply apparatus according to claim 11, wherein
    said driving battery is connected to a negative side of the differential amplifier as a reference input terminal, and
    the multiplexer is connected to a positive side of said differential amplifier.

13. The power supply apparatus for a vehicle according to claim 1, wherein
    said voltage detection circuit detects a voltage with respect to an intermediate voltage of said driving battery.

14. The power supply apparatus for a vehicle according to claim 1, wherein
    the vehicle is a hybrid car or an electric car.

15. A leakage detector for use with an ungrounded power supply having at least one battery module and to be carried in a chassis, said leakage detector comprising:
    a leak detection resistor operable to be connected between the power supply and a chassis ground; and
    a voltage detection circuit operable to measure a voltage of said at least one battery module and operable to measure a chassis voltage induced across said leakage detection resistor.

16. The leakage detector according to claim 15, wherein the power supply has at least two battery modules, and
    said leak detection resistor is operable to be connected to the power supply between two of said at least two battery modules.

* * * * *